June 14, 1927.
J. C. BEEM
1,632,267
DRAFTING INSTRUMENT
Filed March 17, 1926  2 Sheets-Sheet 2
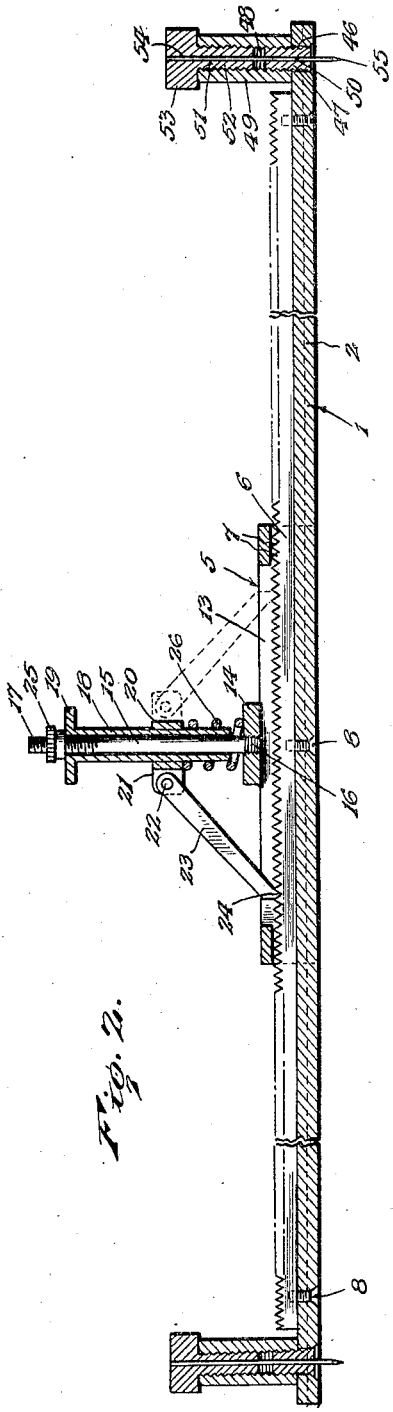
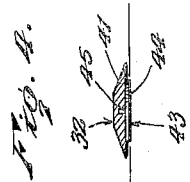
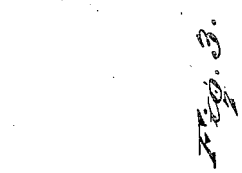
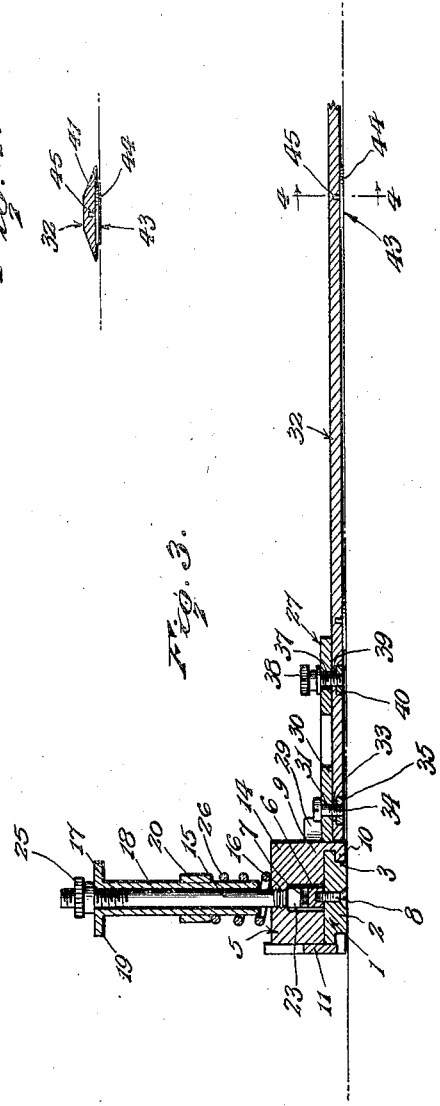
Inventor
J. C. Beem.
By Lacy & Lacy, Attorneys Patented June 14, 1927.

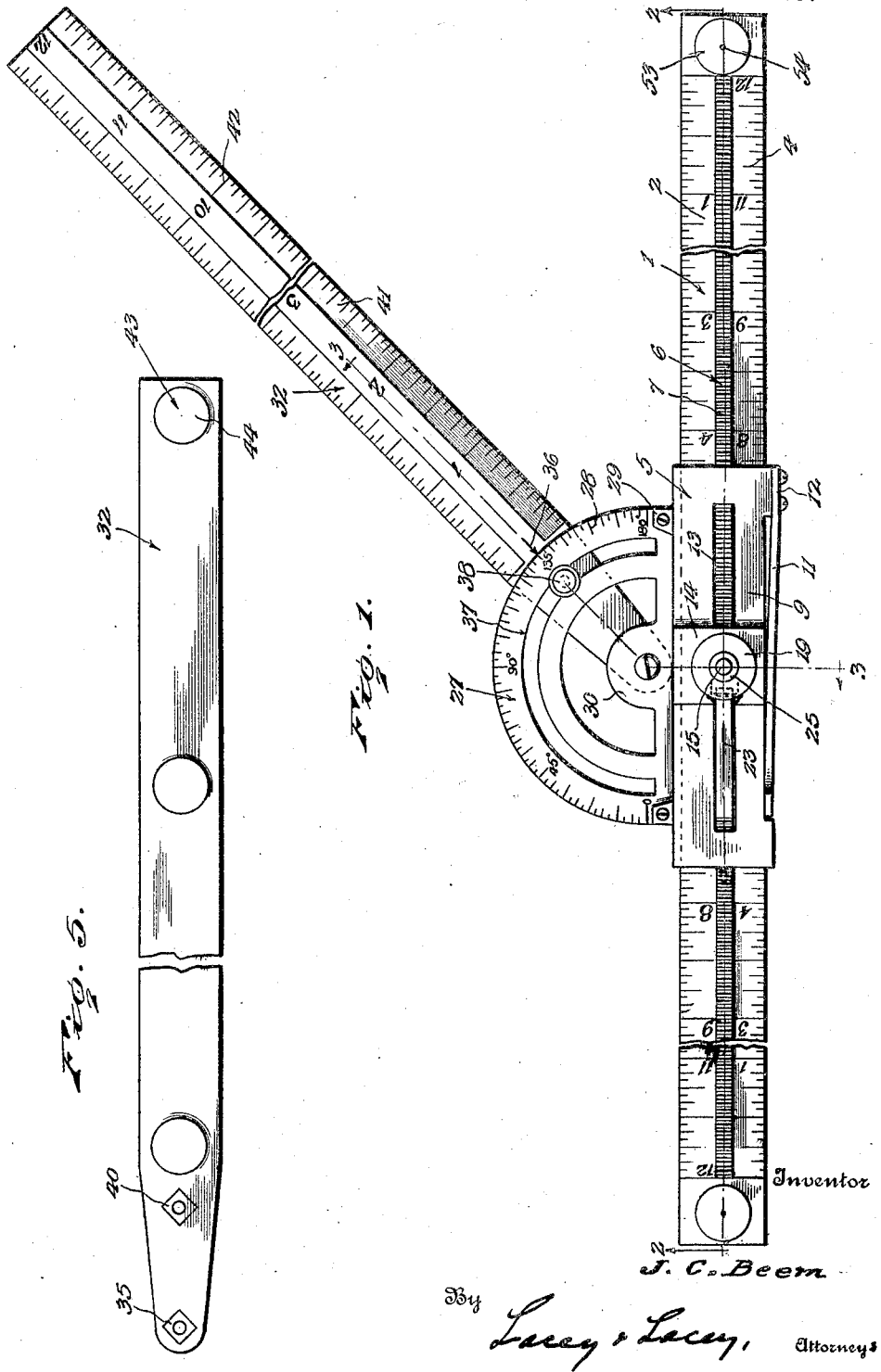

1,632,267

UNITED STATES PATENT OFFICE.

JOHN C. BEEM, OF SAWTELLE, CALIFORNIA.

DRAFTING INSTRUMENT.

Application filed March 17, 1926. Serial No. 95,419.

This invention relates to improvements in drafting instruments and more particularly to instruments which are designed for use in drawing section lines, and one of the objects of the invention is to provide an instrument of this class which may be readily manipulated so as to permit of the drawing of section lines accurately spaced any desired distance. Likewise, the invention contemplates an instrument of this class which may be employed with advantage by architectural and mechanical draftsmen and which may be readily adjusted to permit of the draftsman making his drawings accurately to scale in accordance with specifications.

The instrument is of that type in which a carriage is mounted for sliding movement along a base and supports a ruler arm which is angularly adjustable with relation thereto and is associated with a protractor scale, and in which means is provided whereby the carriage may be advanced with a step by step movement along the base. Ordinarily, in instruments of this type, the carriage is advanced in one direction only so that under some conditions it is impracticable to successfully employ the instrument. The present invention, therefore, has as another object to provide means whereby the carriage may be selectively advanced with a step by step movement in either direction longitudinally of the base of the instrument.

Another object of the invention is to provide a novel construction of ruler arm, the construction being such that great accuracy is insured in the use of the instrument both as regards the length of the lines and the relative spacing thereof.

Another object of the invention is to provide, in connection with the ruler arm of the instrument, means whereby the arm may be supported in such spaced relation to the surface of the drawing paper as to provide against any transference of ink to the straight edge of the arm from the ruling pen in the use of the instrument and which would be liable to cause a blot or blur on the drawing paper.

Another object of the invention is to provide, in connection with the base of the instrument, novel means for securing the base upon the drawing paper or sheet in such a manner as to preclude any buckling of the sheet and any displacement of the instrument with respect thereto, the invention likewise contemplating so constructing the securing means for the base of the instrument that the instrument may be readily removed from its position upon the drawing sheet without mutilation of the sheet or any displacement thereof upon the surface of the drawing board.

In the accompanying drawings:

Figure 1 is a top plan view of the instrument embodying the present invention, the intermediate portions of the base and ruling arm being broken away so as to permit of detailed illustration of the salient features of the instrument.

Figure 2 is a vertical longitudinal sectional view taken substantially on the line 2—2 of Figure 1, looking in the direction indicated by the arrows, and illustrating in full lines the position of the pawl when the instrument is to be employed in ruling lines under conditions where the carriage will be advanced in one direction and illustrating in dotted lines the reverse position of the pawl.

Figure 3 is a vertical sectional view taken substantially on the line 3—3 of Figure 1, looking in the direction indicated by the arrows.

Figure 4 is a vertical transverse sectional view taken substantially on the line 4—4 of Figure 3, looking in the direction indicated by the arrows.

Figure 5 is a bottom plan view of the ruling arm of the instrument.

In the drawings, the instrument is illustrated as embodying a base 1 which comprises a bar of metal or other suitable material indicated by the numeral 2, which bar is provided at its under side along its longitudinal edges with rabbets indicated by the numeral 3, the bar being provided upon its upper side, along each longitudinal edge portion with a linear scale indicated by the numeral 4, and the two scales being so arranged that the indicating ordinals thereof will run numerically in opposite order so that the carriage, which is indicated in general by the numeral 5 and which will presently be more fully described, may register at its ends with the scale marks in the movement of the carriage in either direction longitudinally of the bar 2. The numeral 6 indicates a rack bar which is disposed upon the upper side of the bar 2 and extends longitudinally medially between the lateral edges of the said bar and parallel thereto as clearly shown in Figures 1 and 3 of the drawings. The rack bar 6 is provided upon its upper side with inverted V-shaped rack teeth 7 and the bar is secured in place upon the upper side of the bar 2 by means of countersunk screws 8 which are fitted through the under side of the bar 2 and threaded into sockets in the under side of the rack bar 6. The rack bar 6, as will be observed by reference to Figure 1 of the drawings, extends throughout the entire length of the linear scale bearing surface of the base of the instrument.

The carriage 5 is of metal and comprises a body 9 of rectangular oblong form which is provided at its opposite sides and at its ends with depending inturned lugs 10 which engage within the rabbets 3 in the longitudinal edges of the base 1, so that the carriage is maintained in position upon the base and guided for longitudinal sliding movement thereon. A friction tensioning spring 11 is secured at one end as at 12, to one end of the carriage body 9, at one side thereof and at its free end bears frictionally against one longitudinal edge of the bar 2 comprising the base 1, so as to hold the carriage frictionally in different positions of adjustment. The body 9 of the carriage 5 is formed with a longitudinally medially extending slot 13 which is of a width substantially equal to the thickness of the rack bar 6, and a boss 14 is provided upon the upper side of the said body 9 of the carriage and spans the slot midway between its ends. A post 15 is threaded at its lower end, as at 16, into a threaded socket provided in the upper side of the boss 14 directly above the slot 13, and the upper end portion of this post is threaded as indicated by the numeral 17. The numeral 18 indicates a sleeve which is slidably fitted upon the post 15 and is provided at its upper end with a head or finger piece 19 which serves a purpose to be presently explained. A collar 20 is fixed upon the sleeve 18 at a point suitably spaced above the lower end of the sleeve, and the said collar is provided with a pair of spaced ears 21 between which is pivotally mounted, as at 22, the upper or inner end of a pawl 23 having a tooth 24 at its lower end, of V-shape, to engage between the teeth 7 of the rack bar 8, the said lower end of the pawl engaging in the slot 13, by gravity, and the pawl being of a thickness equal substantially to the width of the slot, so that lateral displacement of the pawl will be effectually prevented, as likewise rotation of the sleeve 18 about the post 15. An adjusting nut 25 is threaded onto the threaded upper portion 17 of the post 15 and bears against the upper side of the head 19, and a spring 26 is arranged upon the lower portion of the sleeve and bears at its upper end against the under side of the collar 20 and at its lower end against the upper side of the boss 14, the said spring yieldably holding the sleeve 18 in an elevated position and with its lower end spaced above the upper side of the said boss 14. At this point it will be evident that with the parts in the position shown in Figure 2 of the drawings, in full lines, the pawl 23 has its tooth 24 resting in engagement with the toothed upper side of the rack bar 6, and the sleeve 18 is in an elevated position, being yieldably supported by the spring 26, as previously explained. It will be evident that upon downward pressure being exerted upon the head or finger piece 19, the sleeve 18 will be moved downwardly upon the post 15 and, due to the engagement of the tooth 24 of the pawl with the teeth of the rack bar, and the thrust exerted against the pawl through the downward movement of the sleeve, the carriage will be bodily shifted along the bar 2 comprising the base 1, and if the nut 25 has been properly adjusted, the carriage will be moved a distance of one tooth by the time the lower end of the sleeve 18 engages the upper side of the boss 14, the tooth 24 of the pawl riding over one of the teeth between which it has previously been engaged and engaging between said tooth and the next succeeding tooth, as the spring 26 returns the sleeve to its original or elevated position. It will be understood at this point that by adjusting the nut 25, the pawl may be adapted to ride over two, three, or any other desired number of the teeth of the rack bar at each downward and upward movement of the sleeve 18, so that by adjusting the said nut, the distance of travel of the carriage at each actuation of the finger piece 19 may be predetermined with accuracy. It will be observed by reference to Figure 2, that with the parts in the positions illustrated in full lines in this figure and through actuation of the sleeve 18 through the medium of the finger piece, the carriage will be advanced in one direction longitudinally of the base 1, and that if it is desired to effect step by step adjustment of the carriage longitudinally of the base in the opposite direction, it is only necessary to lift the pawl upon its pivot and rotate the pawl, its collar 20, and the sleeve 18 upon which the collar is fixed, to the reverse or dotted line position shown in the said figure, in which position, the lower end of the pawl will engage in the other end portion of the slot 13 and the pawl will, through such engagement, be held against any rotative displacement.

The numeral 27 indicates a protractor scale member which is of substantially semi-circular form and which bears a protractor scale 28 at its arcuate margin, and this scale member is supported upon suitable lugs 29 which are formed upon one side of the body 9 of the carriage 5 and projects horizontally from the said carriage, as clearly shown in Figures 1 and 3 of the drawings. The protractor scale member 27 is provided, concentric to its arcuate edge, with a pivot ear 30 having an opening 31 formed therein, and the ruler arm of the instrument, which is indicated in general by the numeral 32, has its inner end portion disposed beneath the protractor scale member 27 and formed with an opening 33 through which is fitted a pivot screw 34 threaded into a nut 35 fitted flush in a recess in the under side of the arm at its said inner end, the arm being preferably of wood. In this manner, the arm is supported for angular adjustment with respect to the base 1 and the arm is preferably provided upon its upper side and midway between its longitudinal edges, with an indicator mark 36 for registration with the scale marks of the protractor scale 28. The scale member 27 is formed with an arcuate slot 37 concentric to the pivot 34, and a set screw 38 is fitted through the said slot and through an opening 39 in the arm 32 and threaded into a nut 40 which is seated flush within a recess in the under side of the said arm, it being understood that by loosening the said screw the arm may be adjusted to assume various angular positions with respect to the base 1 and then secured in place by tightening the nut. It will be observed that the pivot 34 is located directly opposite the post 15 so that the arrangement of the ruler arm with respect to the carriage 5 is a symmetrical one.

The ruler arm 32 is, as stated, preferably of wood, and has its upper side beveled at its longitudinal edges, as indicated by the numeral 41, and the arm is provided along the said edges with a linear scales indicated by the numeral 42. In order that the arm may be supported in slightly elevated position with relation to the drawing paper upon which the instrument is disposed, spacers 43 are provided and each of these spacers comprises a flat circular head 44 having a stud 45 which is secured in the under side of the said ruler arm. In this manner, the ruler arm is so supported that a drawing pen may be moved along its longitudinal edges without liability of transference of any ink to the said edges of the arm and to the drawing paper in a manner to cause a blur or blot, and likewise, inasmuch as said edges of the arm are spaced above the paper by the spacers 43, the arm itself will not come in contact with the surface of the paper.

At this point it will be evident that by suitably angularly adjusting the ruler arm 32 and adjusting the nut 25, parallel lines may be drawn exactly equi-distantly spaced with relation to each other and of any predetermined length within the range of the length of the ruler arm.

The invention contemplates the provision of means for securing the instrument upon a drawing board and this means is best illustrated in Figure 2 of the drawings and will now be described. An opening 46 is formed in the bar 2 comprising the base 1 at each end thereof, between the extremity of the bar and the corresponding or adjacent end of the rack bar 6, and a screw 47 is fitted through the opening and threaded into the lower end of the threaded bore 48 of a tubular post 49 which is disposed at its lower end upon the upper side of the said bar 2, the screw 47 being provided axially with a small bore indicated by the numeral 50. The numeral 51 indicates an adjustable screw having a threaded shank 52 adjustably threaded into the upper portion of the threaded bore 48 of the sleeve 49 and provided at its upper end with a knurled head 53 whereby it may be conveniently rotated, and secured in the said screw axially thereof is the upper portion of a pin 54 having a pointed lower end 55. By reference to Figure 2 of the drawings, it will be understood that by rotatably adjusting the screws 51, the points 55 may be retracted so as to be flush with the under side of the base 1. After the piercing points have been thus adjusted, the instrument is disposed upon the drawing board or drawing sheet, and the screws 51 are then adjusted so as to force the piercing points of the pins 54 into the board, thus firmly anchoring the base of the instrument to the board. One of the advantages presented by this feature of the invention lies in the fact that in removing the instrument from the board it is not necessary to pry the ends of the base from the board but only necessary to adjust the screws 51 to retract the piercing points of the pins.

It will be evident that the spacing between successive section lines drawn by a marking instrument moved along either edge of the ruler arm 32, may be varied by adjusting the nut 25 and that the carriage may be caused to advance along the base 1 of the instrument in either direction by properly positioning the pawl 23. It will likewise be evident that instead of adjusting the nut 25, the finger piece 19 may be depressed a predetermined number of times after drawing each successive section line, so that if the teeth of the rack bar are spaced apart one-twenty-fourth of an inch and the finger piece 19 is depressed and released twice, the section lines will be spaced apart one-twelfth of an inch.

Having thus described the invention, what I claim is:

1. A drafting instrument of the class described comprising a base bar, a carriage slidably disposed upon the upper side of the base bar and adjustable longitudinally thereof and having a longitudinally extending slot, a ruler arm supported upon the carriage for angular adjustment with respect to the base bar, a rack upon the base bar extending longitudinally thereof and in alinement with the slot in the carriage, a pawl upon the carriage engaging between the walls of the slot in the carriage and coacting with the rack and reversibly adjustable to engage the rack in either direction with respect to the length thereof, the engagement of the pawl between the walls of the said slot serving to prevent displacement of the pawl, and means for actuating the pawl to exert a thrust against the teeth of the rack to effect adjustment of the carriage along the base bar.

2. A drafting instrument of the class described comprising a base bar, a carriage slidably adjustable longitudinally thereon, a ruler arm supported upon the carriage for angular adjustment with respect to the base bar, a rack upon the base bar extending longitudinally thereof, a post upon the carriage, a sleeve slidably fitting the post, a spring yieldably holding the sleeve in elevated position, and a pawl carried by the sleeve and coacting with the rack bar whereby depression of the sleeve against the tension of the spring will effect adjustment of the carriage along the base bar, the said sleeve being rotatable upon the post whereby the pawl may be reversibly positioned to coact with the rack in either direction with respect to the length thereof.

3. A drafting instrument of the class described comprising a base bar, a carriage slidably adjustable longitudinally thereon, a ruler arm supported upon the carriage for angular adjustment with respect to the base bar, a rack upon the base bar extending longitudinally thereof, a post upon the carriage, a sleeve slidably fitting the post, a spring yieldably holding the sleeve in elevated position, a pawl carried by the sleeve and coacting with the rack bar whereby depression of the sleeve against the tension of the spring will effect adjustment of the carriage along the base bar, the said sleeve being rotatable upon the post whereby the pawl may be reversibly positioned to coact with the rack in either direction with respect to the length thereof, the said post being threaded, and an adjusting nut fitted to the threaded portion of the post and engaging the upper end of the sleeve and adjustable to limit the sliding movement of the sleeve in an upward direction upon the post and thereby vary the length of stroke of the pawl upon downward sliding movement of the said sleeve.

In testimony whereof I affix my signature.

JOHN C. BEEM. [L. S.]